US007683290B2

(12) United States Patent
Daniel et al.

(10) Patent No.: US 7,683,290 B2
(45) Date of Patent: Mar. 23, 2010

(54) METHOD AND APPARATUS FOR CHARACTERIZING A WELDING OUTPUT CIRCUIT PATH

(75) Inventors: Joe Daniel, Sagamore Hills, OH (US); Tom Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 118 days.

(21) Appl. No.: 11/566,719

(22) Filed: Dec. 5, 2006

(65) Prior Publication Data
US 2007/0262064 A1 Nov. 15, 2007

Related U.S. Application Data

(60) Provisional application No. 60/747,096, filed on May 12, 2006.

(51) Int. Cl.
*B23K 9/10* (2006.01)
(52) U.S. Cl. ............... 219/130.01; 219/130.21; 219/130.33
(58) Field of Classification Search ............ 219/130.01, 219/130.21, 130.33, 130.51
See application file for complete search history.

(56) References Cited

U.S. PATENT DOCUMENTS

| | | | | |
|---|---|---|---|---|
| 4,996,409 A | * | 2/1991 | Paton et al. ............ | 219/130.01 |
| 5,043,557 A | * | 8/1991 | Tabata et al. ........... | 219/130.51 |
| 6,242,711 B1 | * | 6/2001 | Cooper ................... | 219/130.01 |
| 6,498,321 B1 | | 12/2002 | Fulmer et al. | |
| 6,596,970 B2 | | 7/2003 | Blankenship et al. | |
| 6,703,585 B2 | * | 3/2004 | Suzuki .................... | 219/130.01 |
| 6,710,297 B1 | * | 3/2004 | Artelsmair et al. ...... | 219/130.01 |
| 6,730,875 B2 | | 5/2004 | Hsu | |
| 6,930,279 B2 | | 8/2005 | Myers et al. | |
| 2003/0071024 A1 | * | 4/2003 | Hsu ....................... | 219/130.01 |
| 2005/0133488 A1 | * | 6/2005 | Blankenship et al. .. | 219/130.01 |
| 2006/0207983 A1 | * | 9/2006 | Myers et al. .......... | 219/137 PS |
| 2006/0226131 A1 | | 10/2006 | Stava et al. | |

OTHER PUBLICATIONS

International Search Report for International Application No. PCT/IB07/50504, Dec. 11, 2007.

* cited by examiner

*Primary Examiner*—Stephen J Ralis
(74) *Attorney, Agent, or Firm*—Hahn Loeser & Parks LLP

(57) ABSTRACT

Methods and apparatus to characterize a welding output circuit path. A welding output circuit path is characterized in real time with respect to a true energy and/or true power input to the welding output circuit path. A welding output circuit path is also characterized with respect to an inductance of the welding output circuit path. A welding output circuit path is further characterized with respect to a welding output waveform.

16 Claims, 11 Drawing Sheets

US 7,683,290 B2

METHOD AND APPARATUS FOR CHARACTERIZING A WELDING OUTPUT CIRCUIT PATH

REFERENCE TO RELATED APPLICATIONS/INCORPORATION BY REFERENCE

This patent application claims the benefit of and priority to provisional U.S. patent application Ser. No. 60/747,096 filed on May 12, 2006.

U.S. Pat. No. 6,730,875 issued to Hsu on May 4, 2004 is incorporated herein by reference in its entirety. U.S. Pat. No. 6,596,970 issued to Blankenship et al. on Jul. 22, 2003 is incorporated herein by reference in its entirety.

TECHNICAL FIELD

Certain embodiments of the present invention relate to welding. More particularly, certain embodiments of the present invention relate to systems and methods for characterizing a welding circuit output path with respect to true energy or power input, inductance and resistance, and a welding output waveform.

BACKGROUND OF THE INVENTION

Metallurgical properties of a weld are affected by numerous variables like base material composition, filler material and shielding composition and welding process variables. Compositions of the materials are controlled by various methods, quality control procedures, and general manufacturing techniques. The welding process variables are normally documented and checked with additional quality control procedures. However, the large number of welding process variables can be difficult to control. These variables include some items which are easy to control and others which are more difficult to control or measure accurately. The welding process itself could be a constant voltage (CV) or constant current (CC) mode or involve a more complex waveform like surface tension transfer (STT), Pulse, or AC Pulse. As the waveform becomes more complex, or as a welding process becomes more precise with more stringent quality control requirements, the methods used to accurately verify proper operation also become more complex.

An additional variable that can affect the performance of a welding system but is difficult to control, or measure, is the inductance of the welding circuit. Inductance increases with long cables that are typically connected to the output of a welding power source. As this inductance increases, the power source welding performance can degrade because it may not have the ability to reach a desired output within a desired period of time. The power source can only produce a finite amount of voltage which limits this rate of change.

$$V = L * (dI/dt)$$

A combination of all these variables (desired output level, rate of change, and amount of voltage available from the power source) are needed to determine if a specific welding circuit inductance is acceptable or not. Knowing these requirements, measuring the inductance (also measuring the inductance at a high current level), and determining what is acceptable are not functions that an operator can be expected to perform.

Further limitations and disadvantages of conventional, traditional, and proposed approaches will become apparent to one of skill in the art, through comparison of such systems and methods with certain embodiments the present invention as set forth in the remainder of the present application with reference to the drawings.

BRIEF SUMMARY OF THE INVENTION

Embodiments of the present invention comprise a method and apparatus to characterize a welding output circuit path. A welding output circuit path may run from a welding power source through a welding cable to a welding tool, through a workpiece and/or to a workpiece connector, and back through the welding cable to the welding power source, for example. The welding output circuit path may be characterized with respect to any of a true energy or a true power input into the welding output circuit path, an inductance of the welding output circuit path, and a welding output waveform. Such characterizations may be compared to predefined limits and displayed to an operator to indicate acceptability or unacceptability of the welding output circuit path.

These and other advantages and novel features of the present invention, as well as details of illustrated embodiments thereof, will be more fully understood from the following description and drawings.

DETAILED DESCRIPTION OF THE INVENTION

Figure 1:
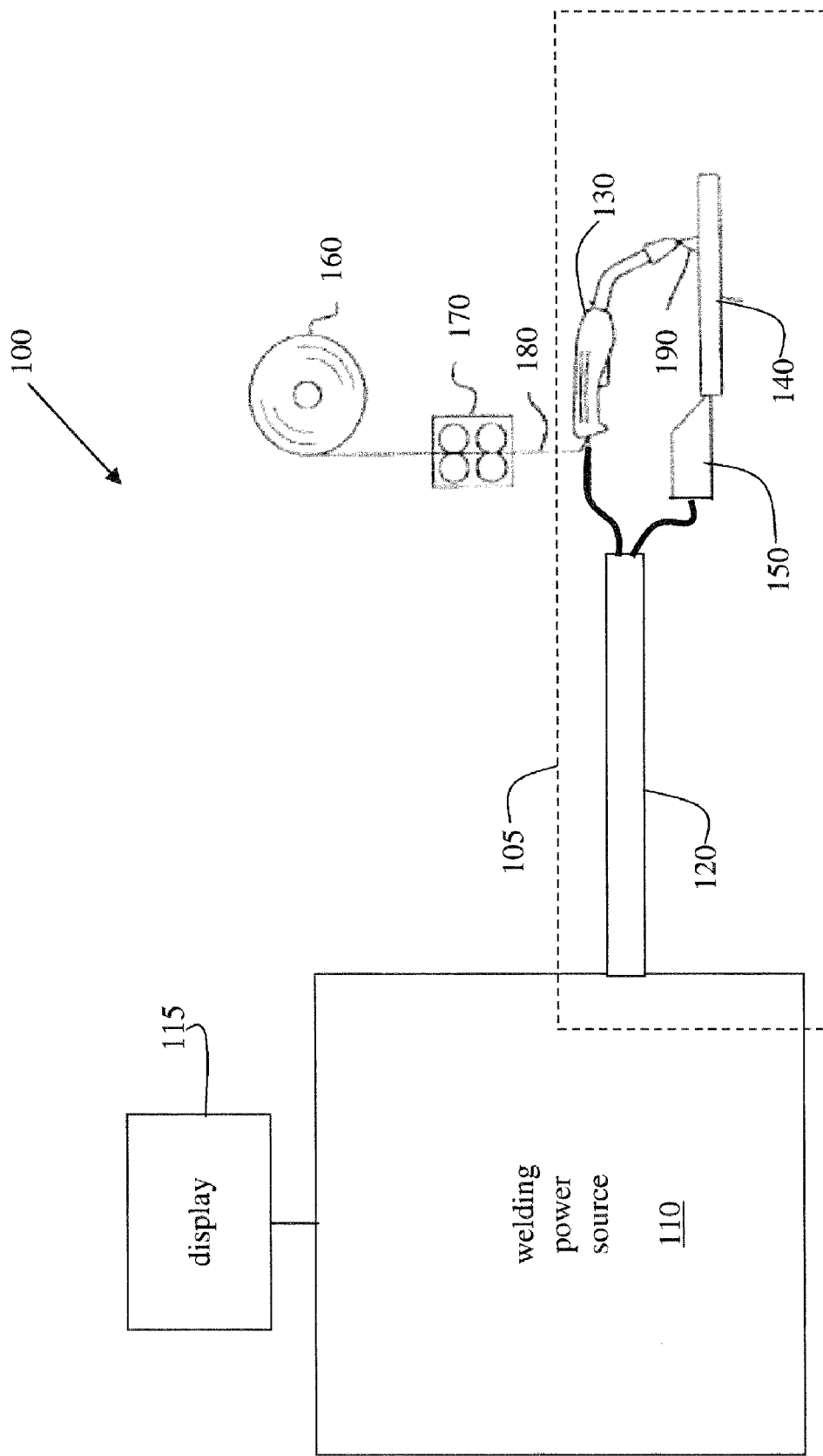
FIG. 1 illustrates a schematic block diagram of an exemplary embodiment of a welding system including a welding output circuit path, in accordance with various aspects of the present invention.

FIG. 1 illustrates a schematic block diagram of an exemplary embodiment of a welding system 100 including a welding output circuit path 105, in accordance with various aspects of the present invention. The welding system 100 includes a welding power source 110 and a display 115 operationally connected to the welding power source 110. Alternatively, the display 115 may be an integral part of the welding power source 10. The welding system 100 further includes a welding cable 120, a welding tool 130, a workpiece connector 150, a spool of wire 160, a wire feeder 170, a wire 180, and an optional workpiece 140. The wire 180 is fed into the welding tool 130 from the spool 160 via the wire feeder 170, in accordance with an embodiment of the present invention. In accordance with another embodiment of the present invention, the welding system 100 does not include a spool of wire 160, a wire feeder 170, or a wire 180 but, instead, includes a welding tool comprising a consumable electrode such as used in, for example, stick welding. In accordance with various embodiments of the present invention, the welding tool 130 may include at least one of a welding torch, a welding gun, and a welding consumable.

The welding output circuit path 105 runs from the welding power source 110 through the welding cable 120 to the welding tool 130, through the workpiece 140 and/or to the workpiece connector 150, and back through the welding cable 120 to the welding power source 110. During operation, electrical current runs through the welding output circuit path 105 as a voltage is applied to the welding output circuit path 105.

In accordance with an embodiment of the present invention, the welding cable 120 comprises a coaxial cable assembly. In accordance with another embodiment of the present invention, the welding cable 120 comprises a first cable length running from the welding power source 110 to the welding tool 130, and a second cable length running from the workpiece connector 150 to the welding power source 110.

In accordance with various embodiments of the present invention, the workpiece 140 may or may not be present as part of the welding output circuit path 105. If the workpiece 140 is not present, the welding tool 130 is connected directly to the workpiece connector 150. If the workpiece 140 is present, the workpiece connector 150 is connected between the workpiece 140 and the welding cable 120. The welding tool 130 may be directly touching the workpiece 140, or an arc 190 may be present between the welding tool 130 and the workpiece 140, for example, as during a welding operation. Also, the part of the wire 180 actually going through the welding tool 130 may be considered part of the output welding circuit path 105, for example, during a welding operation.

Figure 2:
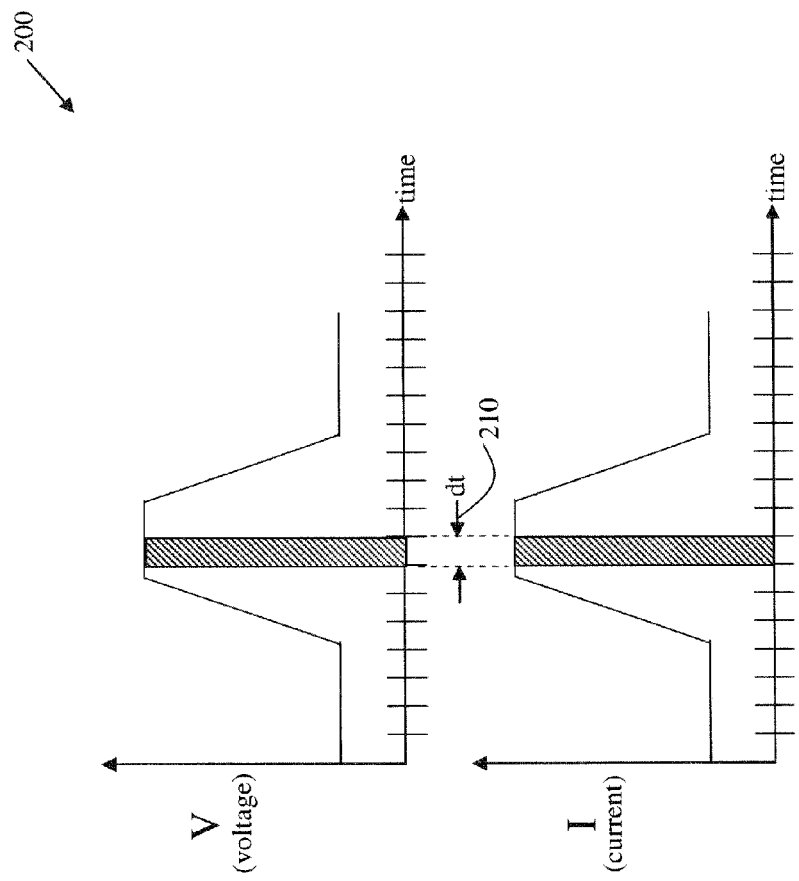
FIG. 2 graphically illustrates a process for determining the true energy and/or true power input to the welding output circuit path of FIG. 1 using a welding output waveform, in accordance with an embodiment of the present invention.

FIG. 2 graphically illustrates a process for determining the true energy and/or true power input to the welding output circuit path 105 of FIG. 1 using a welding output waveform 200, in accordance with an embodiment of the present invention. In accordance with an embodiment of the present invention, the true energy provided by a complex waveform is determined by integrating the product of voltage, current, and time using a sufficiently small sampling interval of time dt 210 as shown in FIG. 2. The necessary sample interval 210 will depend on the frequency content of the voltage/current waveforms and the accuracy desired. Embodiments of the present invention can process this information, calculate the energy input, and present this value to enable/enhance quality control procedures. An embodiment of the present invention includes specialized circuitry to overcome the problems associated with such high speed sampling. Most commercial measurement devices have difficulty operating under these conditions. Alternatively, or in addition, a true power provided by the complex waveform is determined by averaging the product of voltage and current using a sufficiently small sampling interval of time dt 210.

For a sufficiently small time interval, the welding power source will calculate Joule energy (sampled voltage×sampled current×time interval). The Joule energy will then be integrated over a suitable time period and presented to the operator of the equipment.

$$\text{true energy input} = \int V_i * I_i \, dt$$

Alternatively, $$\text{true power input} = [\Sigma V_i * I_i]/N$$

where N is the number of voltage and current sample pairs over the suitable time period.

Fast sampling of the instantaneous voltage and instantaneous current is done within the power source 110 of the welding system such that complex waveforms are sampled at a high enough rate to allow accurate calculation of Joule energy or true power. The samples of instantaneous voltage and current are multiplied together to generate multiple instantaneous energy samples and are integrated over a predefined time interval to generate true input heat or energy, not just some average energy. All of this processing is done in real time within the power source 110 of the welding system. The result may be displayed to an operator of the welding system 100 on a display 115 of the power source 110, for example. Sampled data does not have to be transferred out of the power source at a relatively slow rate to a separate, external computer as in the Hsu patent (U.S. Pat. No. 6,730,875). In accordance with an embodiment of the present invention, the control of the power source 110, using the complex waveforms, provides the high speed sampling.

Figure 3:
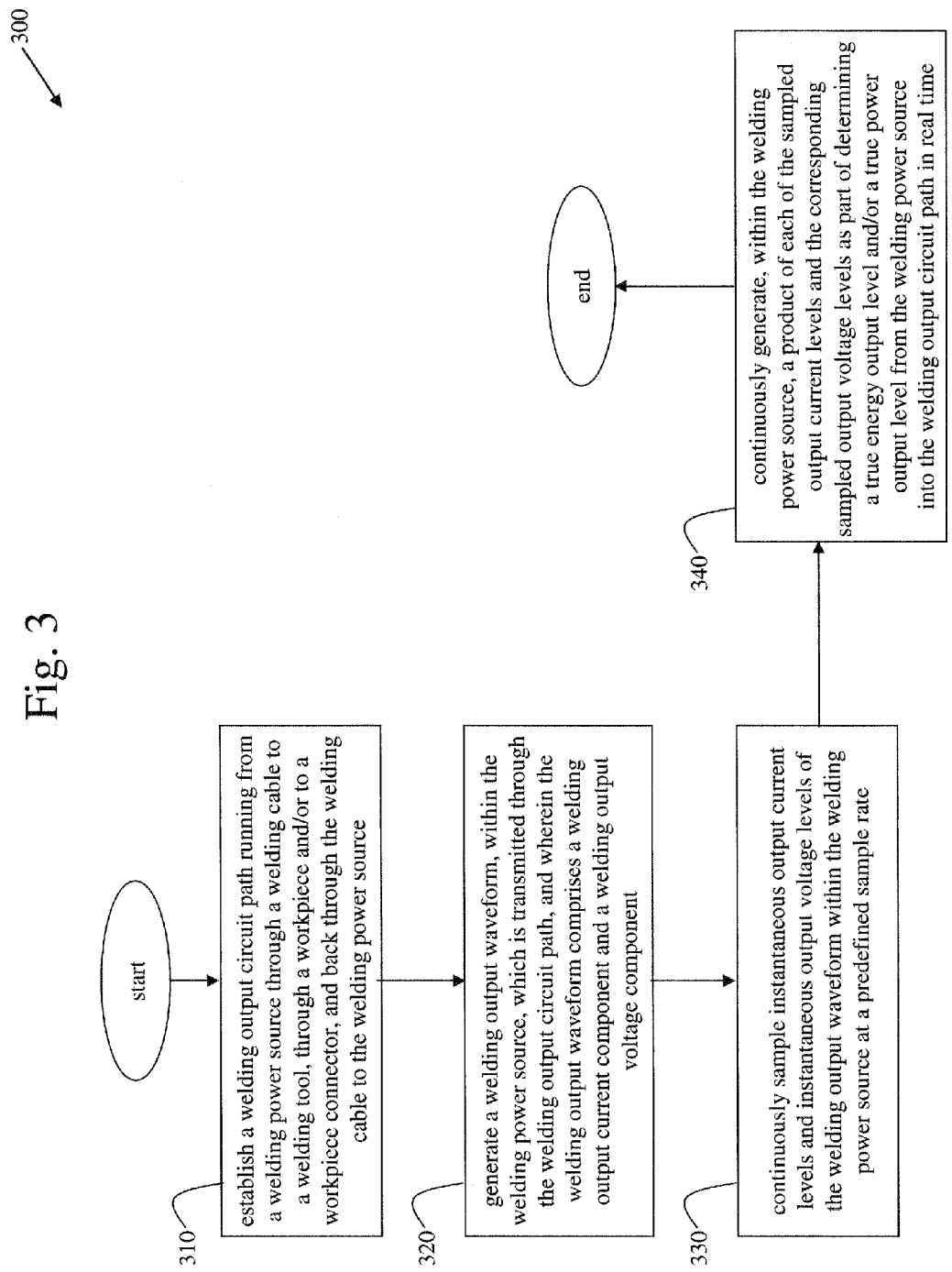
FIG. 3 is a flowchart of an exemplary embodiment of a method for determining the true energy and/or true power input to the welding output circuit path of FIG. 1 according to the illustrated process of FIG. 2, in accordance with various aspects of the present invention.

FIG. 3 is a flowchart of an exemplary embodiment of a method 300 for determining the true energy and/or true power input to the welding output circuit path 105 of FIG. 1 according to the illustrated process of FIG. 2, in accordance with various aspects of the present invention. In step 310, a welding output circuit path is established running from a welding power source through a welding cable to a welding tool, through a workpiece and/or to a workpiece connector, and back through the welding cable to the welding power source. In step 320, a welding output waveform is generated within the welding power source which is transmitted through the welding output circuit path, and wherein the welding output waveform comprises a welding output current component and a welding output voltage component. In step 330, the instantaneous output current levels and the instantaneous output voltage levels of the welding output waveform are continuously sampled within the welding power source at a predefined sample rate. In step 340, a product of each of the sampled output current levels and the corresponding sampled output voltage levels are continuously generated, within the welding power source, as part of determining a true energy output level and/or a true power output level from the welding power source into the welding output circuit path in real time.

In accordance with an embodiment of the present invention, a running integrated value of true energy can be provided over a sliding time interval of, for example, one minute. Such a true energy value may be continuously updated and displayed to an operator on, for example, a display or meter 115 of the power source 110, thus giving the true energy input (i.e., true heat input) over the past one minute interval. Other time intervals may be used instead, in accordance with various other embodiments of the present invention.

The true energy output level, for a predefined time interval, may be divided by a distance traveled by the welding tool 130 during the predefined time interval to calculate a true energy per unit length. With welding travel speed information that can be measured by the welding power source 110, communicated digitally, or manually entered by the operator, the Joule energy may be presented as Joules per unit length. A typical measurement magnitude is kJ/inch. The welding travel speed may be controlled by the power source 110 which provides the welding speed to, for example, an automated robot welder or some other hard automatic or semi-automatic mechanism (not shown). Alternatively, the welding travel speed may be controlled by some other external device which provides the welding speed to the power source 110. Similarly, a true power output level, for a predefined time interval, may be divided by a distance traveled by the welding tool 130 during the predefined time interval to calculate a true power per unit length. A typical measurement magnitude is watts/inch.

Also, the true energy output level, for a predefined time interval, may be divided by a deposited amount of wire during the predefined time interval to calculate a true energy per unit amount of deposited wire. With welding wire feed speed that can be measured by the welding power source 110, communicated digitally, or manually entered, the Joule energy per deposited amount of wire may be presented. A typical measurement magnitude is kJ/pound (of wire deposited). The welding wire feed speed may be measured by the wire feeder 170 itself, in accordance with an embodiment of the present invention. Similarly, the true power output level, for a predefined time interval, may be divided by a deposited amount of wire during the predefined time interval to calculate a true power per unit amount of deposited wire. A typical measurement magnitude is watts/pound.

In the case of having multiple power sources on a single work piece, the combined Joule energy, kJ/inch, or kJ/pound may be compiled and presented to the operator. The information is presented per welding pass and as a total for the entire weld. The information, communicated digitally between the power sources and a central collection point (a master power source or another digital device like a computer) may be further processed for quality control purposes.

in accordance with an embodiment of the present invention, the required heat input (true energy input level) for a particular welding process is entered or communicated to the welding power source. The true energy output level may be displayed on a display 115 along with an indication of acceptability of the true energy output level. If the actual heat input, as determined by an embodiment of the present invention, falls outside the specified limits, the welding power source 110 will alert the operator, log an event, or stop welding. As a result, a welder can know at all times whether or not he is being provided with the required energy for the present welding application. Similarly, the true power input level may be displayed and processed.

Similarly, the true energy or true power per unit length and/or the true energy or true power per unit amount of deposited wire may be displayed along with an indication of acceptability. In accordance with an embodiment of the present invention, the Joule energy, kJ/inch, or kJ/pound is presented to the operator through a display or meter on the power source, on the wire feeder, or on a computer (through digital communications). Using the same measurement technique with a sufficiently small sampling interval, the true power, watts/inch or watts/pound may be presented and communicated in the same way as described above for Joule energy, in accordance with an embodiment of the present invention.

For AC processes (i.e, processes using AC waveforms), the measurement techniques described above represent the total energy. The AC components of this total are separately processed, communicated, and presented as a positive polarity portion, a negative polarity portion, and the total, in accordance with an embodiment of the present invention. The arc efficiency (heat transfer into the base material, i.e., workpiece) may be different for the two polarities. The resulting heat input into the base material is determined with the known energy from the positive and negative polarities.

In accordance with an embodiment of the present invention, the power source 110 knows the welding process, the desired operating point, and the voltage production capability. Therefore the inductance of the welding output circuit can be measured (by the power source) and a determination of acceptability can be presented, in accordance with an embodiment of the present invention. With welding waveforms that are more DC-like (e.g., CC, CV application), a higher inductance level can be tolerated. For more complex waveforms (e.g., pulse waveforms) such a higher inductance level may be unacceptable.

Figure 4:
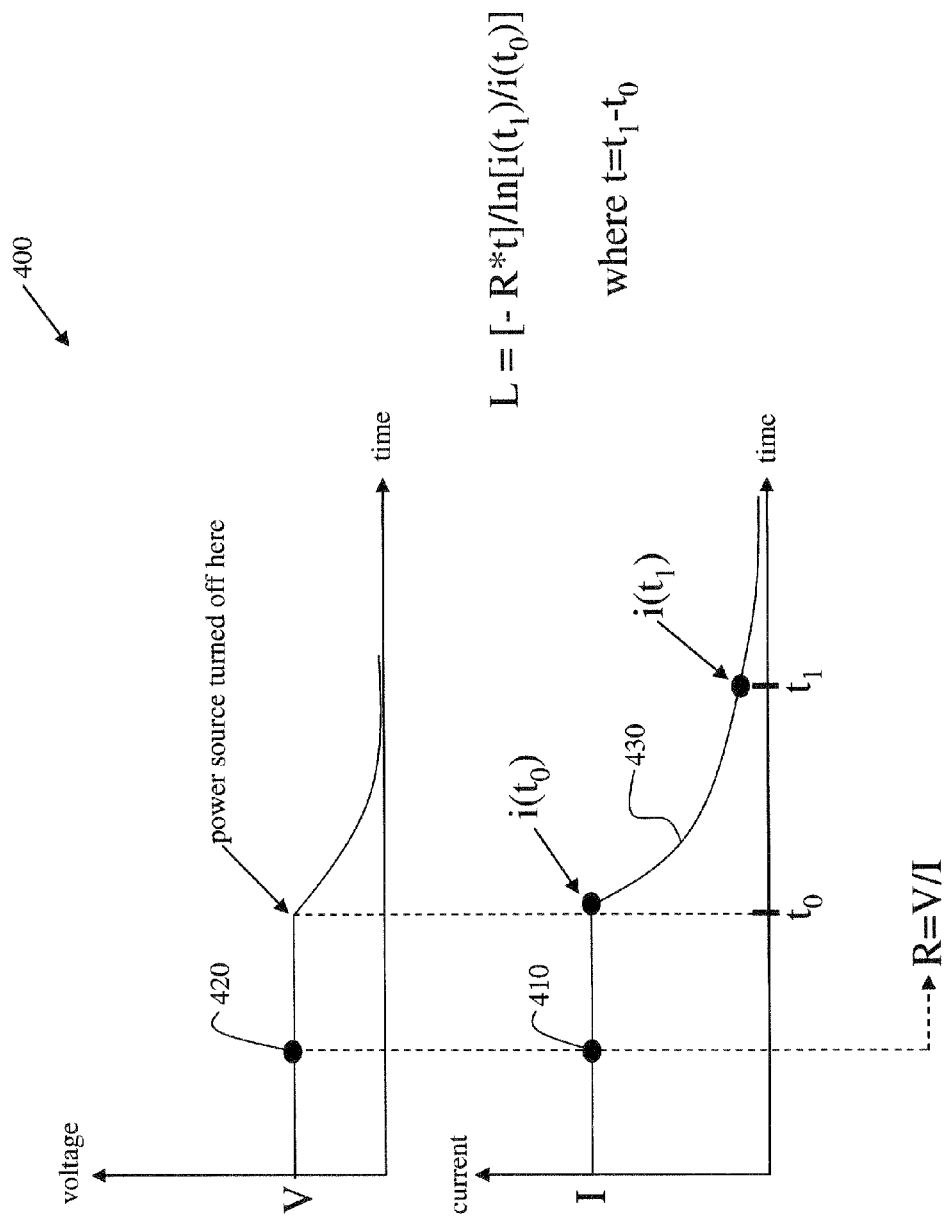
FIG. 4 is a graphical illustration of a process or method for determining the resistance and the inductance of the welding output circuit path of FIG. 1, in accordance with a first embodiment of the present invention.

FIG. 4 is a graphical illustration 400 of a process or method 500 for determining the resistance and the inductance of the welding output circuit path 105 of FIG. 1, in accordance with a first embodiment of the present invention. Again, the welding circuit path runs from the welding power source 110 through the welding cable 120 to the welding tool 130, through the workpiece 140 and/or to the workpiece connector 150, and back through the welding cable 120 to the welding power source 110, in accordance with an embodiment of the present invention. Measurements may be performed with the welding tool 130 short-circuited to the workpiece 140, or measurements may be performed during a welding process when an arc 190 is formed between the welding tool 130 and the workpiece 140.

An inductance measurement technique is built into the welding power source 110, in accordance with an embodiment of the present invention. Referring to FIG. 4, first, the current is regulated to a known value 410 while the voltage 420 is measured. Alternatively, the voltage may be regulated and the resulting current measured. From such current and voltage, the welding circuit resistance may be calculated as:

$R=V/I$, where R is resistance, V is voltage, and I is current.

Next, the power source is turned off and the current decay 430 is measured. Inductance is then estimated by the equation shown in FIG. 4 and given here as:

$L=-(R*t)/(\ln[i(t_1)/i(t_o)])$, where $i(t_o)$ is the current measured at time $t_o$, $i(t_1)$ is the current measured at time $t_1$, and $t=t_1-t_o$.

Such an estimate of inductance L is only a rough approximation since the estimate assumes that all of the energy in the inductance is dissipated in the resistance R. However, in reality, some of the energy is being dissipated by other components as well such as, for example, diodes and switches within the welding power source.

Other calculation methods are possible as well, in accordance with various other embodiments of the present invention. In accordance with an embodiment of the present invention, the power source is able to check its output circuit and determine the resistance and inductance without the use of external instruments.

Figure 5:
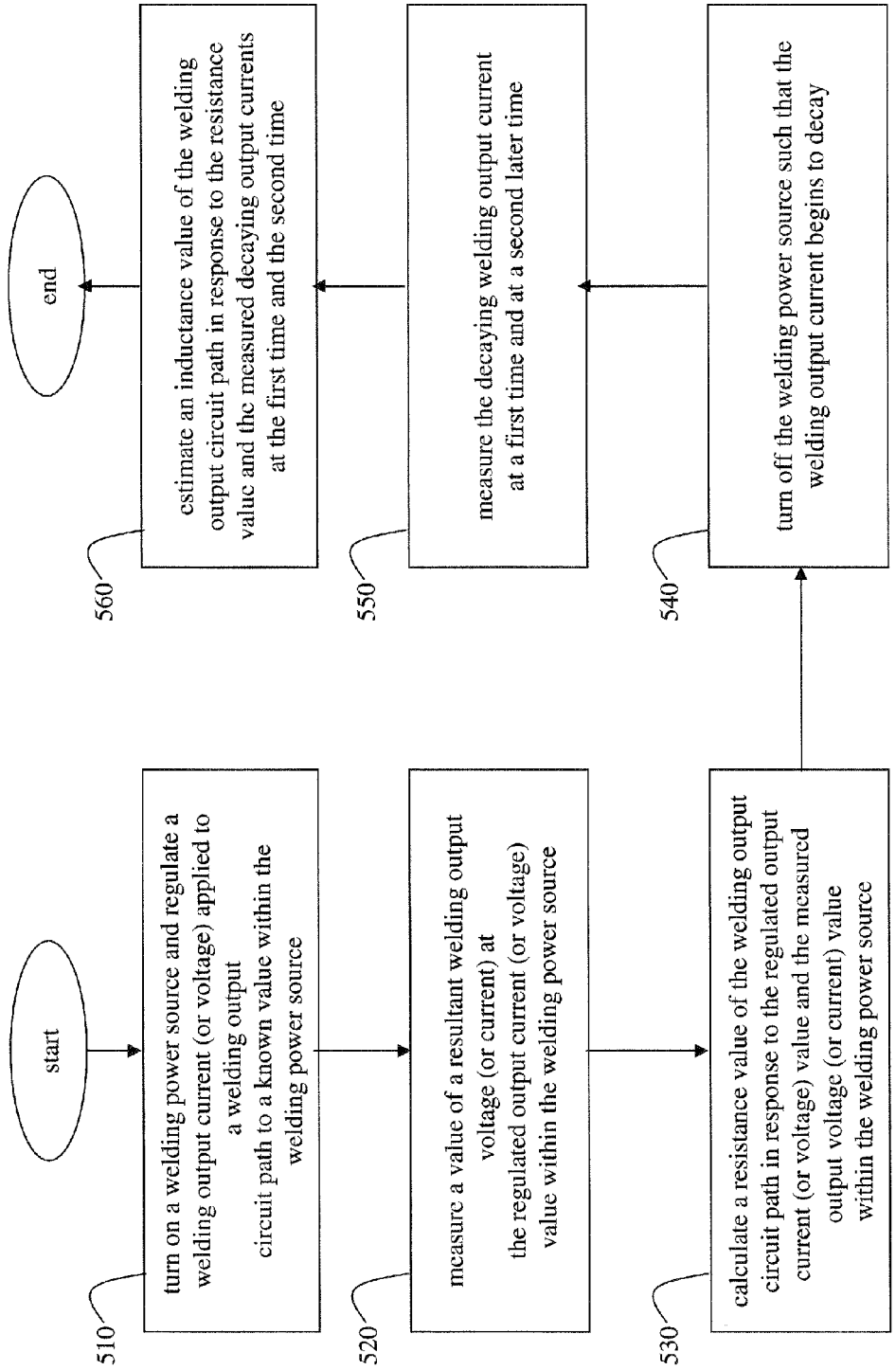
FIG. 5 is a flowchart of a first exemplary embodiment of a method for estimating the resistance and the inductance of the welding output circuit path of FIG. 1 according to the illustrated process of FIG. 4, in accordance with various aspects of the present invention.

FIG. 5 is a flowchart of a first exemplary embodiment of a method 500 for determining the resistance and the inductance of the welding output circuit path 105 of FIG. 1 according to the illustrated process of FIG. 4, in accordance with various aspects of the present invention. In step 510, a welding power source is turned on and a welding output current (or voltage) is regulated, through a welding output circuit path, to a known value within the welding power source. In step 520, a value of a resulting welding output voltage (or current) is measured at the regulated output current (or voltage) value within the welding power source. In step 530, a resistance value of the welding output circuit path is calculated in response to the regulated output current (or voltage) value and the measured output voltage (or current) value within the welding power source. In step 540, the welding power source is turned off such that the welding output current begins to decay. In step 550, the decaying welding output current is measured at a first time and at a second later time. In step 560, an inductance value of the welding output circuit path is estimated in response to the resistance value and the measured decaying output currents at the first time and the second time.

In accordance with an embodiment of the present invention, at least one of the calculated inductance value and calculated resistance value is analyzed with respect to desired output parameters stored within the welding power source. An indication of acceptability of the welding output circuit path is then displayed based on the analysis.

The desired output parameters include at least one of a desired output current or voltage set point, a desired rate of change of an output current or voltage level, and an amount of voltage or current available from the welding power source. Alternatively, the desired output parameters may include some other set point or ramp rate which is a function of output current and/or output voltage (e.g., output power). The requirements for desired output level, rate of change, and amount of voltage available from the power source are stored in the power source. These values are found for the selected welding process and output level. Based on these requirements and the estimated welding circuit inductance (and resistance), an indication is given to the operator, for example, on a display of the power source.

The power source has the capability to measure the input voltage and determine the possible output voltage for a specific output current level. The indication may be in the form of an "Acceptable" or "Un-acceptable" circuit condition. Alternatively, the indication may be in the form of a gauge that presents different levels of the circuit conditions such as, for example, a value from 1 to 10, or a three level indication of Poor, Acceptable, and Ideal. The indication may be communicated digitally for production monitoring/quality control purposes, in accordance with an embodiment of the present invention.

An alarm may be communicated and/or the machine may stop operation if the indication rises above an acceptable level. In addition to the inductance verification/functions described above, the same processes may be applied for the welding circuit resistance.

Figure 6:
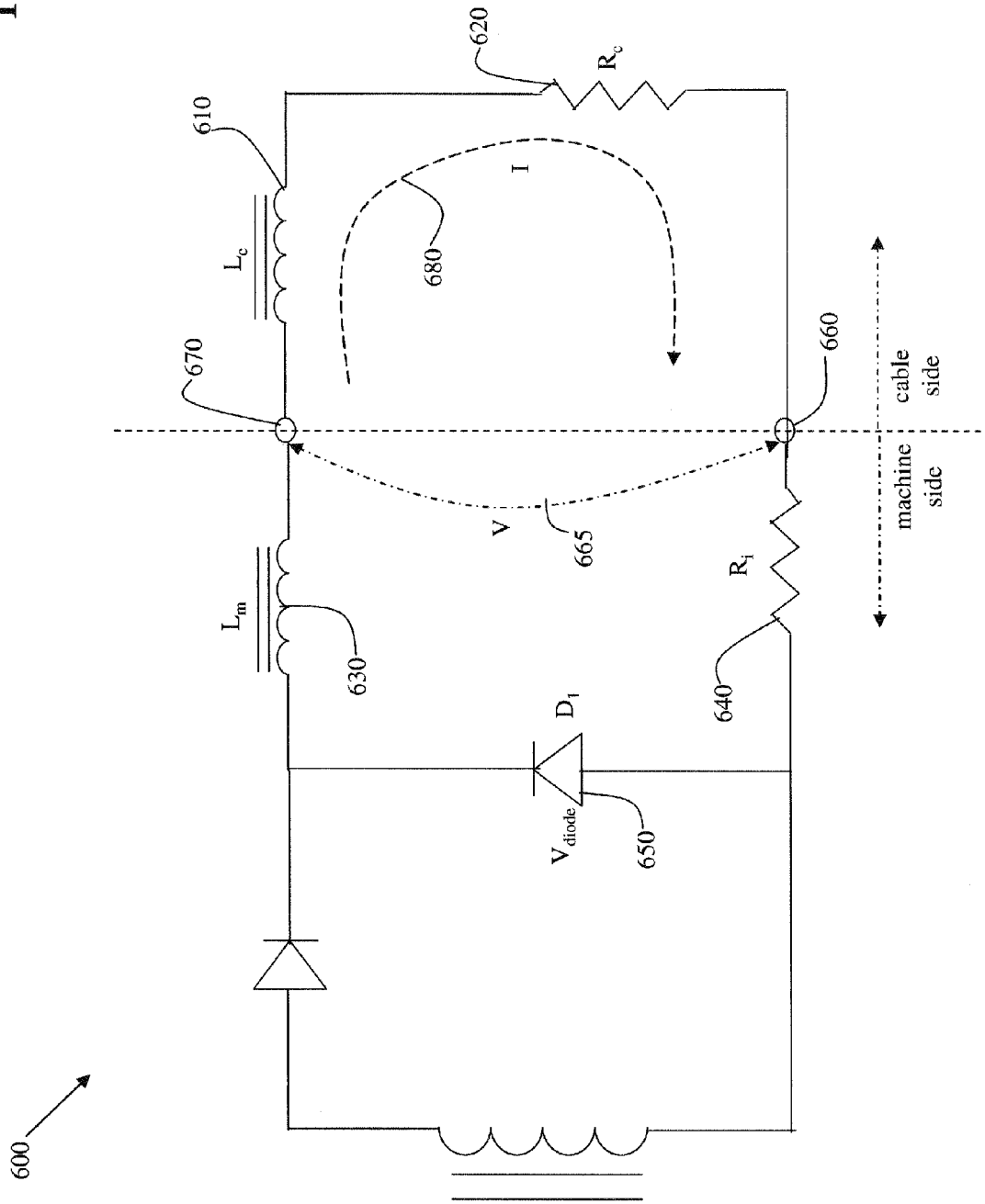
FIG. 6 is an exemplary circuit representation of the welding output circuit path of FIG. 1, in accordance with an embodiment of the present invention.

FIG. 6 is an exemplary circuit representation 600 of the welding output circuit path 105 of FIG. 1, in accordance with an embodiment of the present invention. The circuit representation 600 includes an inductance $L_c$ 610 and a resistance $R_c$ 620 of the welding cable 120 side of the welding output circuit path 105. The circuit representation 600 also includes an inductance $L_m$ 630, an internal resistance $R_i$ 640, and a diode $D_1$ 650 of the welding power source 110 side (machine side) of the welding output circuit path 105. The welding cable 120 connects to the welding power supply 110 at the nodes 660 and 670. When a current I 680 flows through the welding output circuit path 105, the resistances $R_c$ and $R_i$ and the diode $D_1$ help to dissipate energy from the inductors $L_c$ and $L_m$. In accordance with other embodiments of the present invention, other dissipating components may be present in the circuit representation 600 as well such as, for example, a switch (not shown). Such energy-dissipating components are taken into consideration when trying to accurately determine the total inductance $L_T = L_m + L_c$ of the welding output circuit path 105.

Figure 7:
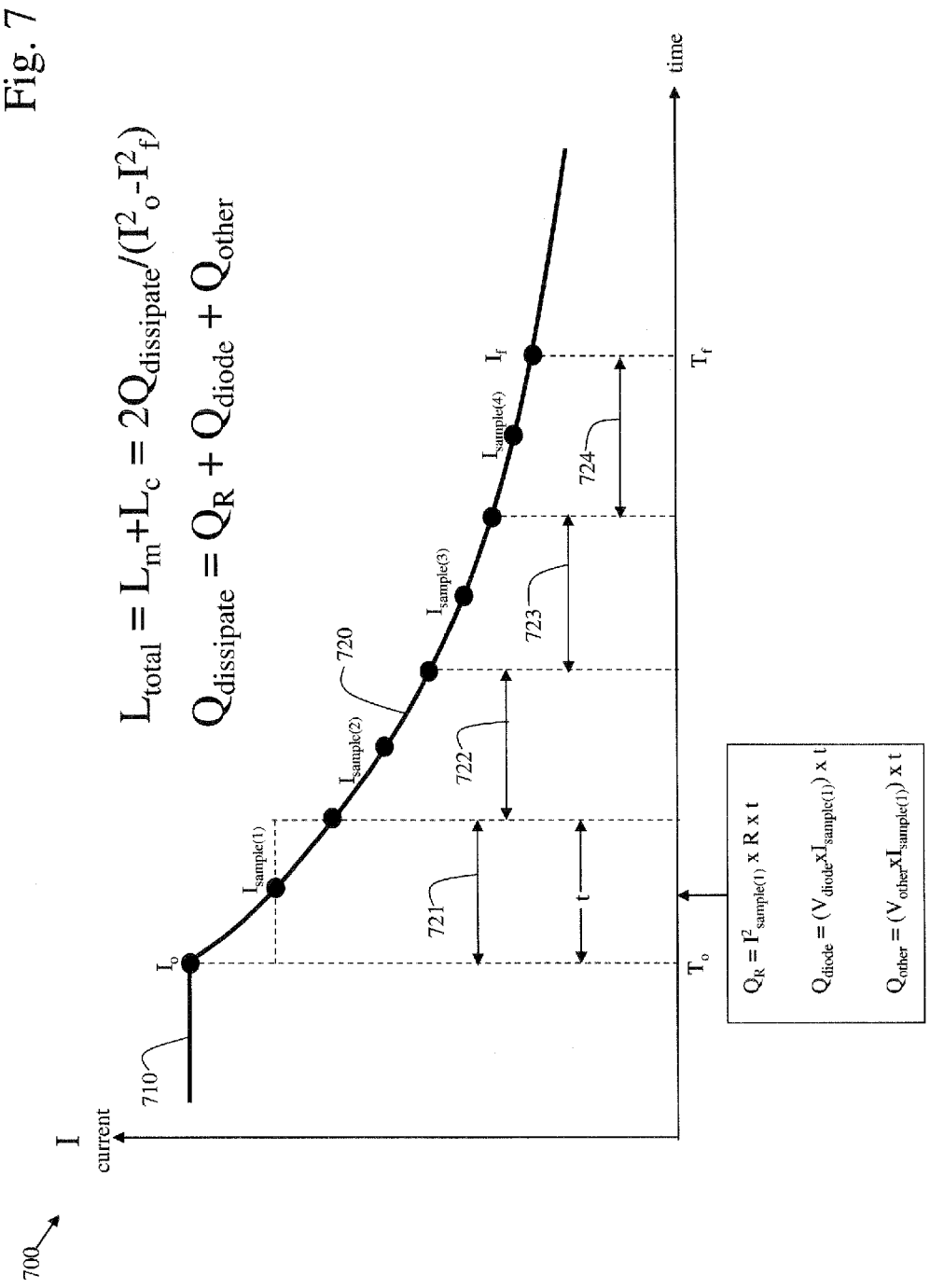
FIG. 7 graphically illustrates a process for more accurately determining the resistance and the inductance of the welding output circuit path represented by the circuit representation of FIG. 6, in accordance with an embodiment of the present invention.

FIG. 7 graphically illustrates a process 700 for more accurately determining the resistance and the inductance of the welding output circuit path 105 represented by the circuit representation 600 of FIG. 6, in accordance with an embodiment of the present invention. Again, the welding circuit path runs from the welding power source 110 through the welding cable 120 to the welding tool 130, through the workpiece 140 and/or to the workpiece connector 150, and back through the welding cable 120 to the welding power source 110, in accordance with an embodiment of the present invention. Measurements may be performed with the welding tool 130 short-circuited to the workpiece 140, or measurements may be performed during a welding process when an arc 190 is formed between the welding tool 130 and the workpiece 140.

An inductance measurement technique is built into the welding power source 110, in accordance with an embodiment of the present invention. Referring to FIG. 6 and FIG. 7, first, the current I is regulated to a known value 710 while the voltage V 665 is measured. In accordance with an alternative embodiment of the present invention, the voltage V 665 may be regulated and the current I is measured. From such known current and voltage, the welding circuit resistance may be calculated as:

$$R_c = V/I$$

$R_i$ is typically very small so as to be insignificant.

Next, current decay is initiated by, for example, turning off the power source. The current decay 720 is measured at a plurality of times between an initial current $I_o$ sampled at an initial time $T_o$ and a final current $I_f$ sampled at a final time $T_f$, as the current decays. A sampled dissipated energy $Q_{sample}$ is calculated for each sample interval (e.g., 721-724) defined by the plurality of samples. For example, referring to FIG. 7, a first sampled dissipated energy $Q_{first}$ is calculated over the sample interval 721 (having a time interval "t") using the sampled current $I_{sample(1)}$. As the current through the circuit path 105 decays, energy from the inductors $L_c$ and $L_m$ is dissipated by $R_c$, $R_i$, $D_1$, and, for example, a switch $S_1$ (not shown).

The energy dissipated by the resistance $R_c$ over the sample interval 721 (having a time interval "t") is:

$$Q_R = I_{sample(1)} \times (R_c) \times t,$$

where $R_c$ is already known from the calculation of the resistance $R_c$ above.

The energy dissipated by the diode $D_1$ over the sample interval 721 is:

$$Q_{diode} = (V_{diode} \times I_{sample(1)}) \times t,$$

where $V_{diode}$ is the voltage drop across the diode $D_1$ at a current value of $I_{sample(1)}$.

The energy dissipated by, for example, a switch $S_1$ over the sample interval 721 is:

$$Q_{switch} = (V_{switch} \times I_{sample(1)}) \times t,$$

where $V_{switch}$ is the voltage drop across the switch $S_1$ at a current value of $I_{sample(1)}$.

The voltages $V_{diode}$ and $V_{switch}$ can vary as $I_{sample}$ varies. Therefore, a look-up-table (LUT) is formed ahead of time based on measured values of $V_{diode}$ and $V_{switch}$ for a certain number of current samples, in accordance with an embodiment of the present invention. As a result, as the process 700 proceeds, $V_{diode}$ and/or $V_{switch}$ may be looked-up within the LUT (or interpolated, if necessary, if $I_{sample}$ falls between two values in the LUT) upon measuring a current sample $I_{sample}$ such that the dissipated energies $Q_{diode}$ and $Q_{switch}$ may be calculated for a particular sample interval.

For example, the $I_{sample}$ values stored in the LUT may be 1 amp, 25 amps, 50 amps, 100 amps, and 200 amps, with corresponding voltage values. The voltage value for any measured $I_{sample}$ value falling between any of the stored $I_{sample}$ values may be determined by interpolation techniques.

Next, the first dissipated energy $Q_{first}$ is found by summing $Q_R$, $Q_{diode}$, and $Q_{switch}$. The process is repeated, as the current decays, for subsequent sample intervals (e.g., 722-724) out to $I_f$ at $T_f$. In accordance with an embodiment of the present invention, the subsequent sample intervals also have a time interval "t". Once the sampled dissipated energies are found for each sampled interval, the sampled dissipated energies are summed to form the total dissipated energy $Q_{TOT}$ over the interval $T_o$ to $T_f$.

In terms of the total inductance $L_T$, the stored energy $Q_{sample}$ for any given sample is:

$$Q_{sample} = \tfrac{1}{2} L_T I^2_{sample}$$

Therefore, the total dissipated energy over the time interval $T_o$ to $T_f$ can be represented in terms of the total inductance $L_T = L_m + L_c$ as:

$$Q_{TOT} = (\tfrac{1}{2} L_T I^2_o) - (\tfrac{1}{2} L_T I^2_f).$$

Solving for $L_T$ yields:

$$L_T = 2 Q_{TOT} / (I^2_o - I^2_f).$$

By plugging in the previously determined value for $Q_{TOT}$, $L_T$ can be solved. Once the total inductance of the welding output circuit path 105 (and, therefore, of the corresponding representative circuit 600) is known, at least one of the calculated inductance value $L_T$ and calculated resistance value $R_T$ is analyzed with respect to desired output parameters stored within the welding power source as described previously herein. An indication of acceptability of the welding output circuit path is then displayed based on the analysis.

Figure 8:
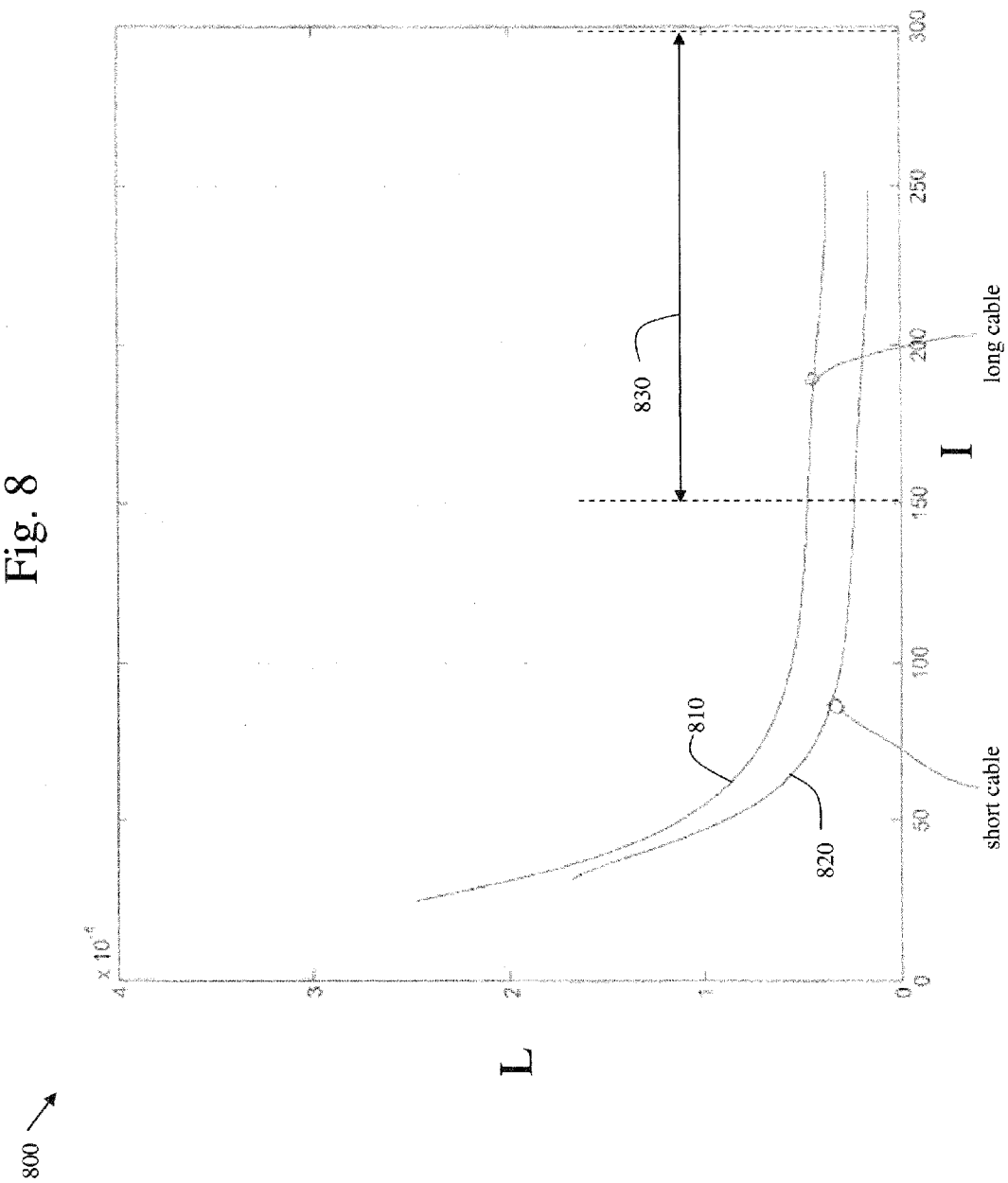
FIG. 8 is an exemplary graph showing how the total inductance of the welding output circuit path represented in FIG. 6 can change as a function of current through the circuit path, in accordance with an embodiment of the present invention.

FIG. 8 is an exemplary graph 800 showing how the total inductance $L_T$ of the welding output circuit path represented in FIG. 6 can change as a function of current I through the circuit path, in accordance with an embodiment of the present invention. A first curve 810 of inductance (L) versus current (I) is shown for a relatively long welding cable, and a second curve 820 of inductance (L) versus current (I) is shown for a relatively short welding cable. Both curves are relatively flat from about 150 amps to 300 amps as shown in the graph 800.

As a result, the process 700 of determining the total inductance $L_T$ and the total resistance $R_T$ is typically conducted over the flat region 830 (e.g., between 150 and 300 amps).

Figure 9:
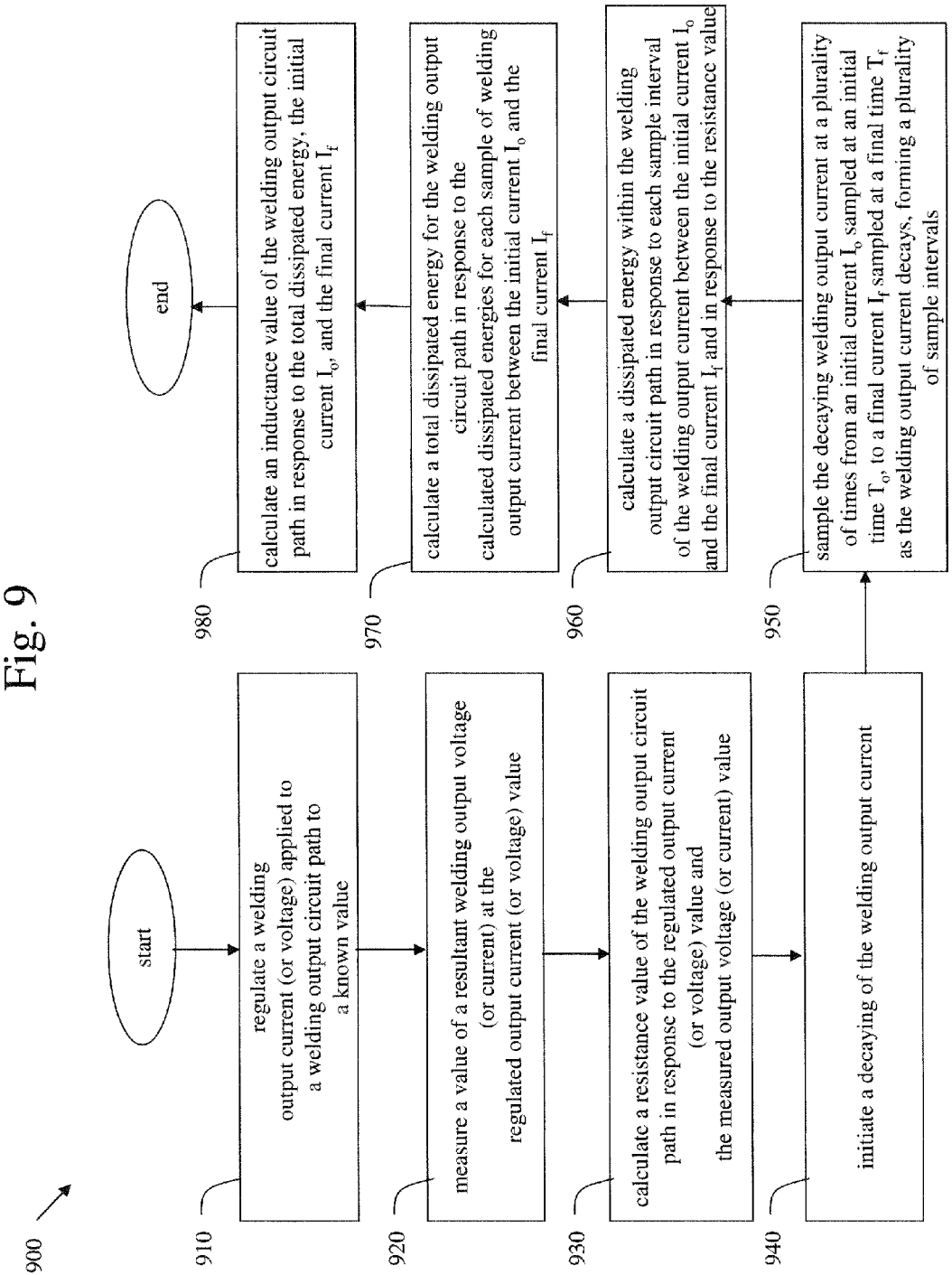
FIG. 9 is a flowchart of a second exemplary embodiment of a method for determining the resistance and the inductance of the welding output circuit path of FIG. 1 and FIG. 6 according to the illustrated process of FIG. 7, in accordance with various aspects of the present invention.

FIG. 9 is a flowchart of a second exemplary embodiment of a method 900 for determining the resistance and the inductance of the welding output circuit path of FIG. 1 and FIG. 6 according to the illustrated process of FIG. 7, in accordance with various aspects of the present invention. In step 910, a welding output current (or voltage) applied to a welding output circuit path is regulated to a known value. In step 920, a value of a welding output voltage (or current) is measured at the regulated output current (or voltage) value. In step 930, a resistance value of the welding output circuit path is calculated in response to the regulated output current (or voltage) value and the measured output voltage (or current) value. In step 940, decay of the welding output current is initiated. In step 950, the decaying welding output current is sampled at a plurality of times from an initial current $I_o$ sampled at an initial time $T_o$, to a final current $I_f$ sampled at a final time $T_f$ as the welding output current decays, forming a plurality of sample intervals.

In step 960, a sampled dissipated energy within the welding output circuit path is calculated in response to each sample interval of the welding output current between the initial current $I_o$ and the final current $I_f$ and in response to the calculated resistance value. In step 970, a total dissipated energy for the welding output circuit path is calculated in response to the calculated sampled dissipated energies. In step 980, an inductance value for the welding output circuit path is calculated in response to the total dissipated energy, the initial current $I_o$, and the final current $I_f$. In accordance with an embodiment of the present invention, the steps 910-980 are performed within the welding power source 110.

Figure 10:
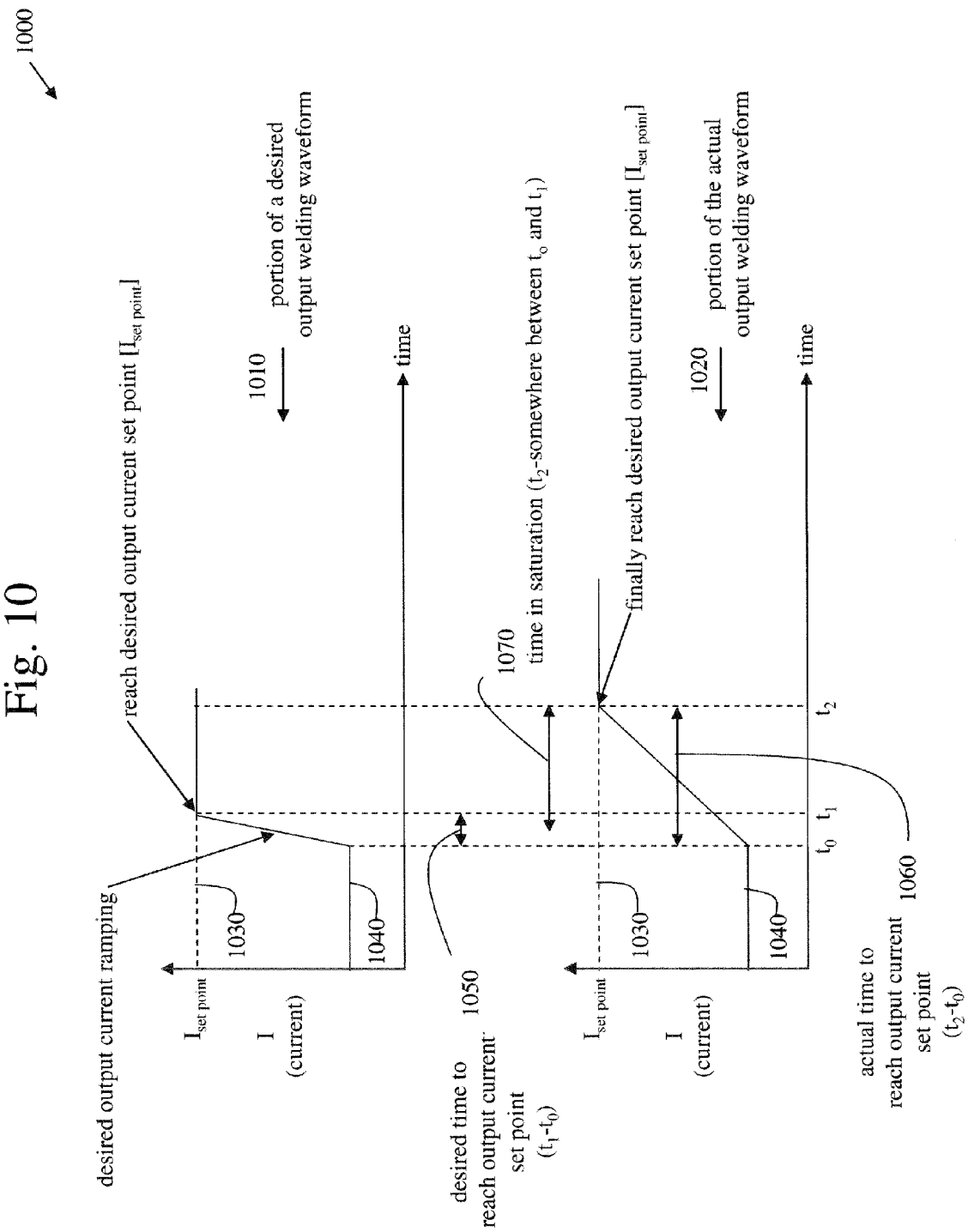
FIG. 10 graphically illustrates a process for characterizing the welding output circuit path of FIG. 1 with respect to a welding output waveform, in accordance with an embodiment of the present invention.

FIG. 10 is a graphical illustration 1000 of a process or method 1100 for characterizing the welding output circuit path 105 of FIG. 1 with respect to a welding output waveform, in accordance with an embodiment of the present invention. As used herein, the term "saturation" means that a welding output current parameter (e.g., current, voltage, power, or any function of current and/or voltage) is not reaching a desired parameter set point in the desired amount of time. The welding output parameter may eventually get to the desired parameter set point, but not soon enough. In such a condition of saturation, a desired welding output waveform cannot be properly generated.

Only so much voltage can be supplied by the welding power source 110 to the welding output circuit path 105. The more voltage available from the welding power source, the quicker the current can be ramped up. In order to generate a portion of a desired welding output waveform, the system 100 is to achieve a certain number of amps in a certain period of time which is a function of the amount of voltage the welding power source can produce, and the amount of inductance in the welding output current path 105. As a result, saturation can be caused by low voltage and/or high inductance. When saturation occurs, the welding power source is not in control of the output current.

As an example of saturation, referring to FIG. 10, a portion 1010 of a desired output welding waveform is shown and a portion 1020 of the actually achieved output welding waveform is shown. A current set point 1030 is predefined for the portion 1010 of the desired waveform. The current set point 1030 may be 300 amps, for example. It is desired that the current of the output welding waveform start at a lower level 1040 (e.g., 100 amps) and increase to the set point level 1030 within a period of time ($t_1$-$t_0$) 1050 (e.g., 50 msec). In actuality, the current of the output welding waveform starts to increase at time $t_0$ but does not reach the desired set point 1030 until time $t_2$. That is, the actual time 1060 for the current to reach the set point 1030 is ($t_2$-$t_0$) (e.g., 200 msec). Therefore, the amount of time that the portion of the actual output welding waveform 1020 is saturated is approximately the time 1070 (e.g., 175 msec). The condition of saturation typically begins somewhere between $t_o$ and $t_1$. The condition of saturation may be because the inductance of the established welding output circuit path 105 is too high, or because the welding power source 110 is not able to supply enough voltage. In accordance with an embodiment of the present invention, the output current is monitored to determine if saturation is occurring.

Figure 11:
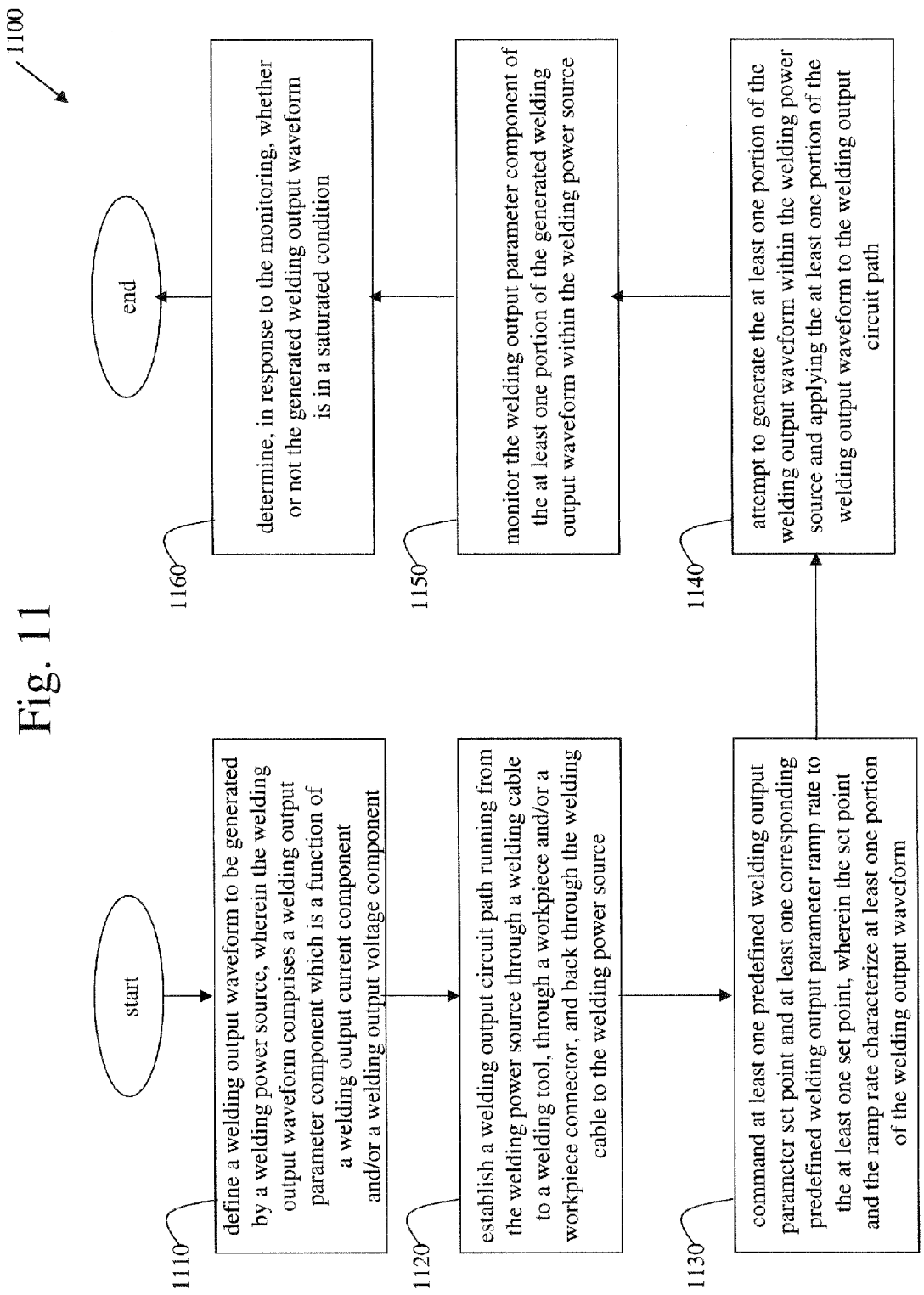
FIG. 11 is a flowchart of an exemplary embodiment of a method for characterizing the welding output circuit path of FIG. 1 with respect to a welding output waveform according to the illustrated process of FIG. 10, in accordance with various aspects of the present invention.

FIG. 11 is a flowchart of an exemplary embodiment of a method 1100 for characterizing the welding output circuit path 105 of FIG. 1 with respect to a welding output waveform according to the illustrated process 1000 of FIG. 10, in accordance with various aspects of the present invention. In step 1110, a welding output waveform to be generated by a welding power source is defined or selected, wherein the welding output waveform comprises a welding output parameter component which is a function of a welding output current component and/or a welding output voltage component. In step 1120, a welding output circuit path is established running from the welding power source through a welding cable to a welding tool, through a workpiece and/or a workpiece connector, and back through the welding cable to the welding power source. In step 1130, at least one predefined output parameter set point and at least one corresponding predefined output parameter ramp rate to the at least one set point are commanded, wherein the set point and the ramp rate characterize at least one portion of the welding output waveform. In step 1140, an attempt is made to generate the at least one portion of the welding output waveform within the welding power source and applying the at least one portion of the welding output waveform to the welding output circuit path. In step 1150, the welding output parameter component of the at least one portion of the generated welding output waveform is monitored within the welding power source. In step 1160, a determination is made, in response to the monitoring, whether or not the generated welding output waveform is in a saturated condition.

In accordance with an embodiment of the present invention, the welding power source 110 includes a control circuit. The control circuit looks at the output current versus the set point and determines if a duty cycle within the welding power supply should be increased in order to achieve the desired current ramp rate for that portion of the waveform. The welding power source, using the control circuit, simply tries to increase output current to achieve a desired current output level (e.g., the set point). The inductance of the welding output circuit path is not necessarily known, and the welding power source is not concerned with achieving any particular output voltage level. Instead, the welding power source is concerned with increasing the output voltage level as much as needed to reach the desired current set point within the desired time interval, thus avoiding saturation.

In accordance with an embodiment of the present invention, the steps 1130-1160 of the method 1100 may be periodically repeated for different portions of a welding output waveform. As a result, the welding power source 110 may calculate a percentage of time that saturation occurs. Alternatively, the welding power source 110 may calculate a frequency of occurrence of saturation. For example, for a given welding output waveform and a particular welding output circuit path, the system 100 may spend 100 milliseconds out of every 500 milliseconds in saturation (i.e., the percentage of time that saturation occurs is 20%, or the frequency of occurrence of saturation is 1 out of 5).

In accordance with an embodiment of the present invention, an indication may be displayed on the display 115 showing that the welding output circuit path 105 is acceptable with respect to the present welding output waveform being used, for example, if the calculated percentage of time that saturation occurs is within a predefined range of acceptability (e.g., is below a predefined threshold value). Also, an indication may be displayed on the display 115 showing that the welding output circuit path 105 is unacceptable with respect to the present welding output waveform being used if the calculated percentage of time that saturation occurs is outside of the predefined range of acceptability (e.g., is above a predefined threshold value).

Similarly, in accordance with another embodiment of the present invention, an indication may be displayed on the display 115 showing that the welding output circuit path 105 is acceptable with respect to the present welding output waveform being used, for example, if the calculated frequency of occurrence of saturation is within a predefined range of acceptability (e.g., is below a predefined threshold value). Also, an indication may be displayed on the display 115 showing that the welding output circuit path 105 is unacceptable with respect to the present welding output waveform being used if the calculated frequency of occurrence of saturation is outside of the predefined range of acceptability (e.g., is above a predefined threshold value).

In accordance with an embodiment of the present invention, the method steps 1130-1160 may be periodically repeated and statistical data may be generated which characterizes any saturation occurring over at least a period of the welding output waveform. For example, a mean time that the waveform is in saturation may be calculated and/or a variance of the saturation time may be calculated, with respect to the period of the welding output waveform.

In accordance with an embodiment of the present invention, means for selecting a welding output waveform may include a switch on the welding power source or an entry keypad operationally connected to the welding power source, for example. Similarly, means for commanding at least one predefined welding output parameter set point and at least one corresponding predefined welding output parameter ramp rate may include switches on the welding power source or an entry keypad operationally connected to the welding power source, for example.

In accordance with an embodiment of the present invention, means for attempting to generate at least one portion of a welding output waveform and applying the portion of the welding output waveform to a welding output circuit path includes the welding power source. Also, means for monitoring the welding output parameter component of the portion of the generated welding output waveform may include a high speed sampling circuit within the welding power source. Furthermore, means for determining, in response to the monitoring, whether or not the generated welding output waveform is in a saturated condition may include a processor within the welding power source, for example. Similarly, means for performing various calculations and generating various data may include a processor within the welding power source.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus to characterize a welding output circuit path with respect to an inductance of said welding output circuit path, said apparatus comprising a welding power source capable of:
   (a) regulating a welding output current applied to a welding output circuit path to a regulated output current value, or regulating a welding output voltage applied to said welding output circuit path to a regulated output voltage value;
   (b) measuring a value of a resultant welding output voltage at said regulated output current value, or measuring a value of a resultant welding output current at said regulated output voltage value;
   (c) calculating a resistance value of said welding output circuit path in response to said regulated output current value and said measured output voltage value, or in response to said regulated output voltage value and said measured output current value;
   (d) initiating a decaying of said welding output current from said regulated output current value or from said measured output current value;
   (e) sampling said decaying welding output current at a plurality of times from an initial current $I_o$ sampled at an initial time $T_o$, to a final current $I_f$ sampled at a final time $T_f$ as said welding output current decays, forming a plurality of sample intervals;
   (f) calculating a dissipated energy within said welding output circuit path in response to each said sample interval of the welding output current between said initial current $I_o$ and said final current $I_f$ and in response to said resistance value;
   (g) calculating a total dissipated energy for said welding output circuit path in response to said calculated dissipated energies for each said sample of welding output current between said initial current $I_o$ and said final current $I_f$; and
   (h) calculating an inductance value of said welding output circuit path in response to said total dissipated energy, said initial current $I_o$, and said final current $I_f$.

2. The apparatus of claim 1 wherein said welding output circuit path runs from said welding power source through a welding cable to a welding tool, through a workpiece and/or to a workpiece connector, and back through said welding cable to said welding power source.

3. The apparatus of claim 1 wherein said welding power source is further capable of analyzing at least one of said estimated inductance value and said calculated resistance value with respect to desired output parameters stored within said welding power source and displaying an indication of acceptability of said welding output circuit path.

4. The apparatus of claim 3 wherein said desired output parameters include at least one of a desired output current set point, a desired rate of change of an output current level, and an amount of voltage available from a welding power source.

5. A method to characterize a welding output circuit path with respect to an inductance of said welding output circuit path, said method comprising:
   regulating a welding output current applied to a welding output circuit path to a regulated current value, or regulating a welding output voltage applied to said welding output circuit path to a regulated voltage value;
   measuring a value of a resultant welding output voltage at said regulated output current value, or measuring a value of a resultant welding output current at said regulated output voltage value;
   calculating a resistance value of said welding output circuit path in response to said regulated output current value and said measured output voltage value, or in response to said regulated output voltage value and said measured output current value;
   initiating a decaying of said welding output current from said regulated output current value or from said measured output current value;
   sampling said decaying welding output current at a plurality of times from an initial current $I_o$ sampled at an initial time $T_o$, to a final current $I_f$ sampled at a final time $T_f$ as said welding output current decays, forming a plurality of sample intervals;
   calculating a dissipated energy within said welding output circuit path in response to each said sample interval of the welding output current between said initial current $I_o$ and said final current $I_f$ and in response to said resistance value;
   calculating a total dissipated energy for said welding output circuit path in response to said calculated dissipated energies for each said sample of welding output current between said initial current $I_o$ and said final current $I_f$; and
   calculating an inductance value of said welding output circuit path in response to said total dissipated energy, said initial current $I_o$, and said final current $I_f$.

6. The method of claim 5 wherein said welding output circuit path runs from a welding power source through a welding cable to a welding tool, through a workpiece and/or to a workpiece connector, and back through said welding cable to said welding power source.

7. The method of claim 5 further comprising analyzing at least one of said calculated inductance value and said calculated resistance value with respect to predefined and stored output parameters, and displaying an indication of acceptability of welding output circuit path.

8. The method of claim 7 wherein said stored output parameters include at least one of a desired output current set point, a desired rate of change of an output current level, and an amount of voltage available from a welding power source.

9. An apparatus to characterize a welding output circuit path with respect to a welding output waveform, said apparatus comprising:
   (a) means for selecting a welding output waveform to be generated, wherein said welding output waveform comprises a welding out parameter component which is a function of at least one of a welding output current component and a welding output voltage component;
   (b) means for establishing a welding output circuit path;
   (c) means for commanding at least one predefined welding output parameter set point and at least one corresponding predefined welding output parameter ramp rate to said at least one set point, wherein said set point and said ramp rate characterize at least one portion of said selected welding output waveform;
   (d) means for attempting to generate said at least one portion of said welding output waveform and applying said at least one portion of said welding output waveform to said welding output circuit path;
   (e) means for monitoring said welding output parameter component of said at least one portion of said generated welding output waveform; and (f) means for determining, in response to said monitoring, whether or not said generated welding output waveform is in a saturated condition.

10. The apparatus of claim 9 further comprising means for calculating a percentage of time that said saturated condition occurs.

11. The apparatus of claim 9 further comprising means for calculating a frequency of occurrence of said saturated condition.

12. The apparatus of claim 10 further comprising means for displaying an indication that said welding output circuit path is:
   acceptable with respect to said welding output waveform if said calculated percentage of time is within a predefined range of acceptability; and
   unacceptable with respect to said welding output waveform if said calculated percentage of time is outside of said predefined range of acceptability.

13. The apparatus of claim 11 further comprising means for displaying an indication that said welding output circuit path is:
   acceptable with respect to said welding output waveform if said calculated frequency of occurrence is within a predefined range of acceptability; and
   unacceptable with respect to said welding output waveform if said calculated frequency of occurrence is outside of said predefined range of acceptability.

14. The apparatus of claim 9 further comprising means for generating statistical data characterizing any said saturated condition over at least a period of said welding output waveform.

15. A method to characterize, in real time, a welding output circuit path with respect to at least one of a true energy and a true power input to said welding output circuit path, a method comprising:
   establishing a welding output circuit path running from a welding power source through a welding cable to a welding tool, through at least one of a workpiece and to a workpiece connector, and back through said welding cable to said welding power source;
   generating a welding output waveform, within said welding power source, which is transmitted through said welding output circuit path, and wherein said welding output waveform comprises a welding output current component and a welding output voltage component;
   continuously sampling instantaneous output current levels and instantaneous output voltage levels of said welding output waveform within said welding power source at a predefined sample rate;
   continuously generating, within said welding power source, a product of each of said sampled output current levels and said corresponding sampled output voltage levels as part of determining at least one of a true energy output level and a true power output level from said welding power source into said welding output circuit path in real time; and
   dividing at least one of said true energy output level and said true power output level over a predefined time interval by a deposited amount of wire during said predefined time interval to calculate at least one of a true energy per unit amount of deposited wire and a true power per unit amount of deposited wire.

16. The method of claim 15 further comprising displaying at least one of said true energy per unit amount deposited wire and said true power per unit amount of deposited wire on a display along with an indication of acceptability of at least one of said true energy per unit amount of deposited wire and said true power per unit amount of deposited wire.

\* \* \* \* \*